United States Patent
Luo

(10) Patent No.: US 6,288,183 B1
(45) Date of Patent: Sep. 11, 2001

(54) CATALYST COMPOSITION AND PROCESS FOR CONTROLLING THE CHARACTERISTICS OF CONJUGATED DIENE POLYMERS

(75) Inventor: Steven Luo, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/475,345

(22) Filed: Dec. 30, 1999

(51) Int. Cl.⁷ .............................. C08F 4/70; C08F 136/06
(52) U.S. Cl. ..................... 526/153; 526/138; 526/139; 526/142; 526/169.1; 526/335; 526/337; 502/117
(58) Field of Search .................... 526/138, 139, 526/142, 153, 169.1, 335, 337; 502/117

(56) References Cited

U.S. PATENT DOCUMENTS

| | | | |
|---|---|---|---|
| 3,419,505 | 12/1968 | Marsico | 260/2 |
| 3,457,186 | * 7/1969 | Marsico et al. | 252/429 |
| 3,498,963 | 3/1970 | Ichikawa et al. | 260/94.3 |
| 3,725,373 | 4/1973 | Yoo | 260/88.7 R |
| 3,778,424 | 12/1973 | Sugiura et al. | 260/94.3 |
| 3,957,894 | 5/1976 | Saeki et al. | 260/666 |
| 4,048,418 | 9/1977 | Throckmorton | 526/138 |
| 4,148,983 | 4/1979 | Throckmorton | 526/139 |
| 4,168,357 | 9/1979 | Throckmorton et al. | 526/139 |
| 4,168,374 | 9/1979 | Throckmorton et al. | 526/139 |
| 4,182,813 | 1/1980 | Makino et al. | 526/92 |
| 4,379,889 | 4/1983 | Ashitaka et al. | 525/247 |
| 4,751,275 | 6/1988 | Witte et al. | 526/139 |
| 5,239,023 | 8/1993 | Hsu et al. | 526/141 |
| 5,283,294 | 2/1994 | Hsu et al. | 525/247 |
| 5,356,997 | 10/1994 | Massie, II et al. | 525/237 |
| 5,677,405 | 10/1997 | Goodall et al. | 526/281 |
| 5,891,963 | 4/1999 | Brookhart et al. | 525/326.1 |
| 5,919,875 | 7/1999 | Luo et al. | 526/139 |

OTHER PUBLICATIONS

Abstract of Japanese patent publication JP 45011154, Takahashi et al., Apr. 1970.*
Abstract of Japanese Patent No. 45011154, 4/1970.
Syndiotactic 1,2–Polybutadiene with Co–$CS_2$ Catalyst System I. Preparation Properties and Application of Highly Crystalline Syndiotactic 1,2–Polybutadiene, II. Catalyst for Stereospecific Polymerization of Butadiene to Syndiotactic 1,2–Polybutadiene, III. $^1H$ and $^{13}C$–NMR Study of Highly Syndiotactic 1,2–Polybutadiene and IV Mechanism of Syndiotactic Polymerization of Butadiene with Cobalt Compounds–Organoaluminum–$CS_2$, *Journal of Polymer Science: Polymer Chemistry Edition*, by H. Ashitaka et al., vol. 21, pp. 1853–1860 and 1951–1995, (1983).
Comprehensive Polymer Science, by Porri and Giarrusso, Pergamon Press, Oxford, vol. 4, p. 53, (1989).
English Abstract of Japanese Patent No. 48–6939, 1975.
English Abstract of Japanese Patent No. 48/64178, 1973.

* cited by examiner

Primary Examiner—David W. Wu
Assistant Examiner—R. Rabago
(74) Attorney, Agent, or Firm—David G. Burleson; Arthur M. Reginelli

(57) ABSTRACT

A catalyst composition that is the combination of or the reaction product of ingredients including an iron-containing compound, a hydrogen phosphite, and a mixture of two or more organoaluminum compounds. This catalyst composition is particularly useful for polymerizing conjugated dienes. When this catalyst composition is used to polymerize 1,3-butadiene into syndiotactic 1,2-polybutadiene the ratio of the organoaluminum compounds can be adjusted to vary the melting temperature and molecular weight of the polymer product.

19 Claims, No Drawings

CATALYST COMPOSITION AND PROCESS FOR CONTROLLING THE CHARACTERISTICS OF CONJUGATED DIENE POLYMERS

FIELD OF THE INVENTION

The present invention generally relates to a process for polymerizing conjugated dienes. More particularly, the process of the present invention employs a catalyst composition that is formed by combining an iron-containing compound, a hydrogen phosphite, and a blend of two or more sterically distinct organoaluminum compounds. By utilizing this catalyst composition, the characteristics, such as the melting temperature, of the resulting conjugated diene polymers can be manipulated. The preferred embodiments of the present invention are directed toward a process for polymerizing 1,3-butadiene into syndiotactic 1,2-polybutadiene whereby the melting temperature of the resulting polymer can be controlled.

BACKGROUND OF THE INVENTION

Syndiotactic 1,2-polybutadiene is a crystalline thermoplastic resin that has a stereoregular structure in which the side chain vinyl groups are located alternately on the opposite sides in relation to the polymeric main chain. Syndiotactic 1,2-polybutadiene is a unique material that exhibits the properties of both plastics and rubber, and therefore it has many uses. For example, films, fibers, and various molded articles can be made from syndiotactic 1,2-polybutadiene. It can also be blended into and co-cured with natural or synthetic rubber.

Syndiotactic 1,2-polybutadiene can be made by solution, emulsion or suspension polymerization. The physical properties of syndiotactic 1,2-polybutadiene are largely determined by its melting temperature and molecular weight. Generally, syndiotactic 1,2-polybutadiene has a melting temperature within the range of about 195° C. to about 215° C., but due to processability considerations, it is generally desirable for syndiotactic 1,2-polybutadiene to have a melting temperature of less than about 195° C. Accordingly, there is a need for means to regulate the melting temperature and molecular weight of syndiotactic 1,2-polybutadiene.

Various transition metal catalyst systems based on cobalt, titanium, vanadium, chromium, and molybdenum for the preparation of syndiotactic 1,2-polybutadiene have been reported. The majority of these catalyst systems, however, have no practical utility because they have low catalytic activity or poor stereoselectivity, and in some cases they produce low molecular weight polymers or partially crosslinked polymers unsuitable for commercial use.

The following two cobalt-based catalyst systems are well known for the preparation of syndiotactic 1,2-polybutadiene on a commercial scale: (1) a system containing cobalt bis(acetylacetonate), triethylaluminum, water, and triphenylphosphine (U.S. Pat. Nos. 3,498,963 and 4,182,813), and (2) a system containing cobalt tris(acetylacetonate), triethylaluminum, and carbon disulfide (U.S. Pat. No. 3,778,424). These cobalt-based catalyst systems also have disadvantages.

The first cobalt catalyst system referenced above yields syndiotactic 1,2-polybutadiene having very low crystallinity. Also, this catalyst system develops sufficient catalytic activity only when halogenated hydrocarbon solvents are used as the polymerization medium, and halogenated solvents present toxicity problems.

The second cobalt catalyst system referenced above uses carbon disulfide as one of the catalyst components. Because of its low flash point, obnoxious smell, high volatility, and toxicity, carbon disulfide is difficult and dangerous to use, and requires expensive safety measures to prevent even minimal amounts escaping into the atmosphere. Furthermore, the syndiotactic 1,2-polybutadiene produced with this cobalt catalyst system has a very high melting temperature of about 200–210° C., which makes it difficult to process the polymer. Although the melting temperature of the syndiotactic 1,2-polybutadiene produced with this cobalt catalyst system can be reduced by employing a catalyst modifier as a fourth catalyst component, the presence of this catalyst modifier has adverse effects on the catalyst activity and polymer yields. Accordingly, many restrictions are required for the industrial utilization of these cobalt-based catalyst systems.

Coordination catalyst systems based on iron-containing compounds, such as the combination of iron(III) acetylacetonate and triethylaluminum, have been known for some time, but they have shown very low catalytic activity and poor stereoselectivity for the polymerization of 1,3-butadiene. The product mixture often contains oligomers, low molecular weight liquid polymers, and partially crosslinked polymers. Therefore, these iron-based catalyst systems have no industrial utility.

Because syndiotactic 1,2-polybutadiene is useful and the catalysts known heretofore in the art have many shortcomings, it would be advantageous to develop a new and significantly improved catalyst composition that has high activity and stereoselectivity for polymerizing 1,3-butadiene into syndiotactic 1,2-polybutadiene. It would be additionally advantageous if that catalyst system was versatile enough to control the melting temperature and molecular weight of the polymerization product.

SUMMARY OF THE INVENTION

In general, the present invention provides a process for preparing conjugated diene polymers with desired characteristics comprising the step of polymerizing conjugated diene monomers in the presence of a catalytically effective amount of a catalyst composition formed by combining (a) an iron-containing compound, (b) a hydrogen phosphite, and (c) a blend of two or more sterically distinct organoaluminum compounds.

The present invention also provides a method for controlling the melting temperature of a crystalline conjugated diene polymer that is prepared by polymerizing conjugated diene monomers with a catalyst composition that is formed by combining (a) an iron-containing compound, (b) a hydrogen phosphite, and (c) a blend of two or more sterically distinct organoaluminum compounds, the method comprising the steps of selecting at least one sterically hindered organoaluminum compound; selecting at least one sterically non-hindered organoaluminum compound; combining the selected organoaluminum compounds to form ingredient (c) of the catalyst composition; and thereafter polymerizing the conjugated diene monomers with the catalyst composition.

The present invention also provides a catalyst composition formed by a process comprising the step of combining (a) an iron-containing compound, (b) a hydrogen phosphite, and (c) a blend of two or more sterically distinct organoaluminum compounds.

Advantageously, the catalyst composition utilized in the present invention has very high catalytic activity and stereoselectivity for polymerizing conjugated diene monomers such as 1,3-butadiene. This activity and selectivity, among other advantages, allows conjugated diene polymers, such as syndiotactic 1,2-polybutadiene, to be produced in very high yields with low catalyst levels after relatively short polymerization times. Significantly, the catalyst composition of this invention is very versatile. By blending sterically distinct organoaluminum compounds, it is possible to produce crystalline conjugated diene polymers, such as syndiotactic 1,2-polybutadiene, with a wide range of melting temperatures and molecular weights, thus eliminating the need to add a melting temperature regulator or a molecular weight regulator that adversely affects the catalyst activity and the polymer yield. In addition, the catalyst composition utilized in this invention does not contain carbon disulfide. Therefore, the toxicity, objectionable smell, dangers, and expense associated with the use of carbon disulfide are eliminated. Further, the catalyst composition utilized in this invention is iron-based, and iron compounds are generally stable, inexpensive, relatively innocuous, and readily available. Furthermore, the catalyst composition utilized in this invention has a high catalytic activity in a wide variety of solvents including the environmentally-preferred nonhalogenated solvents such as aliphatic and cycloaliphatic hydrocarbons.

Other advantages and features of the present invention will be apparent from a consideration of the following detailed description of the present invention.

DETAILED DESCRIPTION OF ILLUSTRATIVE EMBODIMENTS

The present invention is generally directed toward a process for synthesizing conjugated diene polymers by using an iron-based catalyst composition. The preferred embodiments of this invention are directed toward the synthesis of crystalline conjugated diene polymers, such as syndiotactic 1,2-polybutadiene. The iron-based composition is formed by combining (a) an iron-containing compound, (b) a hydrogen phosphite, and (c) a blend of two or more sterically distinct organoaluminum compounds. It has now been found that the characteristics of the resulting conjugated diene polymer can be adjusted by selecting certain sterically distinct organoaluminum compounds. For example, the melting temperature of crystalline conjugated diene polymers can be adjusted by selecting certain sterically distinct organoaluminum compounds or by varying the molar ratio of the sterically distinct organoaluminum compounds.

As noted above, the catalyst composition of the present invention is formed by combining (a) an iron-containing compound, (b) a hydrogen phosphite, and (c) a blend of two or more sterically distinct organoaluminum compounds. In addition to the three catalyst ingredients (a), (b), and (c), other organometallic compounds or Lewis bases can also be added, if desired.

Various iron-containing compounds or mixtures thereof can be employed as ingredient (a) of the catalyst composition of this invention. It is generally advantageous to employ iron-containing compounds that are soluble in a hydrocarbon solvent such as aromatic hydrocarbons, aliphatic hydrocarbons, or cycloaliphatic hydrocarbons. Hydrocarbon-insoluble iron-containing compounds however, can be suspended in the polymerization medium to form the catalytically active species and are therefore also useful.

The iron atom in the iron-containing compounds can be in various oxidation states including but not limited to the 0, +2, +3, and +4 oxidation states. It is preferable to use divalent iron compounds (also called ferrous compounds), wherein the iron is in the +2 oxidation state, and trivalent iron compounds (also called ferric compounds), wherein the iron is in the +3 oxidation state. Suitable types of iron-containing compounds that can be utilized include, but are not limited to, iron carboxylates, iron carbamates, iron dithiocarbamates, iron xanthates, iron β-diketonates, iron alkoxides, iron aryloxides, and organoiron compounds.

Some specific examples of suitable iron carboxylates include iron(II) formate, iron(III) formate, iron(II) acetate, iron(III) acetate, iron(II) acrylate, iron(III) acrylate, iron(II) methacrylate, iron(III) methacrylate, iron(II) valerate, iron (III) valerate, iron(II) gluconate, iron(III) gluconate, iron(II) citrate, iron(III) citrate, iron(II) fumarate, iron(III) fumarate, iron(II) lactate, iron(III) lactate, iron(II) maleate, iron(III) maleate, iron(II) oxalate, iron(III) oxalate, iron(II) 2-ethylhexanoate, iron(III) 2-ethylhexanoate, iron(II) neodecanoate, iron(III) neodecanoate, iron(II) naphthenate, iron(III) naphthenate, iron(II) stearate, iron(III) stearate, iron(II) oleate, iron(III) oleate, iron(II) benzoate, iron(III) benzoate, iron(II) picolinate, and iron(III) picolinate.

Some specific examples of suitable iron carbamates include iron(II) dimethylcarbamate, iron(III) dimethylcarbamate, iron(II) diethylcarbamate, iron(III) diethylcarbamate, iron(II) diisopropylcarbamate, iron(III) diisopropyl-carbamate, iron(II) dibutylcarbamate, iron(III) dibutylcarbamate, iron(II) dibenzyl-carbamate, and iron(III) dibenzylcarbamate.

Some specific examples of suitable iron dithiocarbamates include iron(II) dimethyldithiocarbamate, iron(III) dimethyldithiocarbamate, iron(II) diethyl-dithiocarbamate, iron(III) diethyldithiocarbamate, iron(II) diisopropyldithio-carbamate, iron(III) diisopropyldithiocarbamate, iron(II) dibutyldithiocarbamate, iron(III) dibutyldithiocarbamate, iron(II) dibenzyldithiocarbamate, and iron(III) di-benzyldithiocarbamate.

Some specific examples of suitable iron xanthates include iron(II) methylxanthate, iron(III) methylxanthate, iron(II) ethylxanthate, iron(III) ethyl-xanthate, iron(II) isopropylxanthate, iron(III) isopropylxanthate, iron(II) butyl-xanthate, iron(III) butykanthate, iron(II) benzylxanthate, and iron(III) benzyl-xanthate.

Some specific examples of suitable iron β-diketonates include iron(II) acetylacetonate, iron(III) acetylacetonate, iron(II) trifluoroacetylacetonate, iron(III) trifluoroacetylacetonate, iron(II) hexafluoroacetylacetonate, iron(III) hexafluoroacetylacetonate, iron(II) benzoylacetonate, iron(III) benzoylacetonate, iron(II) 2,2,6,6-tetramethyl-3,5-heptanedionate, and iron(III) 2,2,6,6-tetramethyl-3,5-heptanedionate.

Some specific examples of suitable iron alkoxides or aryloxides include iron(II) methoxide, iron(III) methoxide, iron(II) ethoxide, iron(III) ethoxide, iron(II) isopropoxide, iron(III) isopropoxide, iron(II) 2-ethylhexoxide, iron(III) 2-ethylhexoxide, iron(II) phenoxide, iron(III) phenoxide, iron(II)nonylphenoxide, iron(III)nonylphenoxide, iron(II) naphthoxide, and iron(III)naphthoxide.

The term organoiron compound refers to any iron compound containing at least one iron-carbon bond. Some specific examples of suitable organoiron compounds include bis(cyclopentadienyl)iron(II) (also called ferrocene), bis (pentamethylcyclopentadienyl)iron(II) (also called decamethylferrocene), bis(pentadienyl)iron(II), bis(2,4-dimethylpentadienyl)iron(II), bis(allyl)dicarbonyl-iron(II), (cyclopentadienyl)(pentadienyl)iron(II), tetra(1-norbornyl) iron (IV), (trimethylenemethane)tricarbonyliron(II), bis (butadiene)carbonyliron (0), butadienetricarbonyliron(0), and bis(cyclooctatetraene)iron(0).

Useful hydrogen phosphite compounds that can be employed as ingredient (b) of the catalyst composition of this invention are acyclic hydrogen phosphites, cyclic hydrogen phosphites, and mixtures thereof.

In general, the acyclic hydrogen phosphites may be represented by the following keto-enol tautomeric structures:

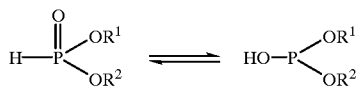

Where $R^1$ and $R^2$, which may be the same or different, are mono-valent organic groups. Preferably, $R^1$ and $R^2$ are hydrocarbyl groups such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. The acyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R^1$ and $R^2$ groups, the type of solvent, and the like. Both tautomers may be associated in dimeric, trimeric or oligomeric forms by hydrogen bonding. Either of the two tautomers or mixtures thereof can be employed.

Some representative and non-limiting examples of suitable acyclic hydrogen phosphites are dimethyl hydrogen phosphite, diethyl hydrogen phosphite, dibutyl hydrogen phosphite, dihexyl hydrogen phosphite, dioctyl hydrogen phosphite, didecyl hydrogen phosphite, didodecyl hydrogen phosphite, dioctadecyl hydrogen phosphite, bis(2,2,2-trifluoroethyl)hydrogen phosphite, diisopropyl hydrogen phosphite, bis(3,3-dimethyl-2-butyl)hydrogen phosphite, bis(2,4-dimethyl-3-pentyl)hydrogen phosphite, di-t-butyl hydrogen phosphite, bis(2-ethylhexyl)hydrogen phosphite, dineopentyl hydrogen phosphite, bis(cyclopropylmethyl) hydrogen phosphite, bis(cyclobutylmethyl)hydrogen phosphite, bis(cyclopentylmethyl)hydrogen phosphite, bis(cyclohexylmethyl)hydrogen phosphite, dicyclobutyl hydrogen phosphite, dicyclopentyl hydrogen phosphite, dicyclohexyl hydrogen phosphite, dimethyl hydrogen phosphite, diphenyl hydrogen phosphite, dinaphthyl hydrogen phosphite, dibenzyl hydrogen phosphite, bis(1-naphthylmethyl)hydrogen phosphite, diallyl hydrogen phosphite, dimethallyl hydrogen phosphite, dicrotyl hydrogen phosphite, ethyl butyl hydrogen phosphite, methyl hexyl hydrogen phosphite, methyl neopentyl hydrogen phosphite, methyl phenyl hydrogen phosphite, methyl cyclohexyl hydrogen phosphite, methyl benzyl hydrogen phosphite, and the like. Mixtures of the above dihydrocarbyl hydrogen phosphites may also be utilized.

In general, cyclic hydrogen phosphites contain a divalent organic group that bridges between the two oxygen atoms that are singly-bonded to the phosphorus atom. These cyclic hydrogen phosphites may be represented by the following keto-enol tautomeric structures:

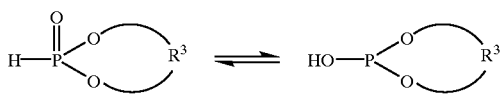

Where $R^3$ is a divalent organic group. Preferably, $R^3$ is a hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to 20 carbon atoms. These hydrocarbylene groups may contain heteroatoms such as, but not limited to, nitrogen, oxygen, silicon, sulfur, and phosphorus atoms. The cyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R^3$ group, the type of solvent, and the like. Both tautomers may be associated in dimeric, trimeric or oligomeric forms by hydrogen bonding. Either of the two tautomers or mixtures thereof can be used.

The cyclic hydrogen phosphites may be synthesized by the transesterification reaction of an acyclic dihydrocarbyl hydrogen phosphite (usually dimethyl hydrogen phosphite or diethyl hydrogen phosphite) with an alkylene diol or an arylene diol. Procedures for this transesterification reaction are well known to those skilled in the art. Typically, the transesterification reaction is carried out by heating a mixture of an acyclic dihydrocarbyl hydrogen phosphite and an alkylene diol or an arylene diol. Subsequent distillation of the side-product alcohol (usually methanol or ethanol) that results from the transesterification reaction leaves the new-made cyclic hydrogen phosphite.

Some specific examples of suitable cyclic alkylene hydrogen phosphites are 2-oxo-(2H)-5-butyl-5-ethyl-1,3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl-1,3,2-dioxaphosphorinane, 2-oxo-(2H)-5-ethyl-5-methyl-1,3,2-dioxaphosphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H)-4,6-dimethyl-1,3,2-dioxaphosphorinane, 2-oxo-(2H)-4-propyl-5-ethyl-1,3,2-dioxaphosphorinane, 2-oxo-(2H)-4-methyl-1,3,2-dioxaphosphorinane, 2-oxo-(2H)-4,5-dimethyl-1,3,2-dioxaphospholane, 2-oxo-(2H)-4,4,5,5-tetramethyl-1,3,2-dioxaphospholane, and the like. Mixtures of the above cyclic alkylene hydrogen phosphites may also be utilized.

Some specific examples of suitable cyclic arylene hydrogen phosphites are 2-oxo-(2H)-4,5-benzo-1,3,2-dioxaphospholane, 2-oxo-(2H)-4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, 2-oxo-(2H)-4,5-naphthalo-1,3,2-dioxaphospholane, and the like. Mixtures of the above cyclic arylene hydrogen phosphites may also be utilized.

As noted above, ingredient (c) of the catalyst composition of the present invention includes a blend of two or more organoaluminum compounds that have distinct steric hindrance. It is generally advantageous to employ organoaluminum compounds that are soluble in hydrocarbon solvent. As used herein, the term "organoaluminum compound"

refers to any aluminum compound containing at least one aluminum-carbon bond. In a preferred embodiment, ingredient (c) of the catalyst composition utilized in this invention is formed by combining at least one organoaluminum compound that is sterically hindered with at least one organoaluminum compound that is sterically less hindered or, more simply stated, non-hindered.

The organoaluminum compounds employed to form ingredient (c) are generally characterized by containing at least one organic group that is attached to an aluminum atom via a carbon atom. The structure of these organic groups determines whether the organoaluminum compound is sterically hindered or non-hindered for purposes of this invention. The structures of these organic groups are best explained with reference to the following figure, which shows an organic group attached to an aluminum atom:

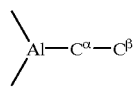

where $C^\alpha$ will be referred to as the α carbon and $C^\beta$ will be referred to as the β carbon. In general, the steric hindrance of an organoaluminum compound is determined by the substitution patterns of the α and β carbons. An organoaluminum compound is sterically hindered where the α carbon is secondary or tertiary, i.e., has only one or no hydrogen atom bonded thereto. Also, an organoaluminum compound is hindered where the β carbon has only one or no hydrogen atom bonded thereto. On the other hand, an organoaluminum compound is non-hindered where the α carbon is primary, i.e., has two hydrogen atoms bonded thereto, and the β carbon has at least two hydrogen atoms bonded thereto. Other non-hindered organic groups include $CH_3$ or $CH_2F$.

Non-limiting examples of sterically hindered organic groups include isopropyl, isobutyl, t-butyl, neopentyl, cyclohexyl, 1-methylcyclopentyl, and 2,6-dimethylphenyl groups. Non-limiting examples of non-hindered organic groups include methyl, ethyl, n-propyl, n-butyl, n-hexyl, and n-octyl groups.

Those skilled in the art will understand that an organoaluminum compound may include both hindered and non-hindered organic groups because the aluminum atom generally has a valence of three as shown in the foregoing figure. In the event that the organoaluminum compound includes both hindered and non-hindered organic groups, then, for purposes of this specification, the compound will be deemed to be both sterically hindered and non-hindered because it is believed that both the hindered and non-hindered organic groups will have an impact on the characteristics of the resulting polymer.

A preferred class of organoaluminum compounds that can be utilized to form ingredient (c) is represented by the general formula $AlR_nX_{3-n}$, where each R, which may be the same or different, is a mono-valent organic group that is attached to the aluminum atom via a carbon atom, where n is an integer of 1 to 3, and where each X, is selected from a hydrogen atom, a carboxylate group, an alkoxide group, or an aryloxide group. Preferably, each R is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. Also, these hydrocarbyl groups may contain heteroatoms such as oxygen, sulfur, nitrogen, silicon, and phosphorous atoms. Preferably, each X is a carboxylate group, an alkoxide group, or an aryloxide group, with each group preferably containing from 1 carbon atom, or the appropriate minimum number of carbon atoms to form the group, up to about 20 carbon atoms.

Thus, some suitable types of organoaluminum compounds that can be utilized include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum aryloxide, hydrocarbylaluminum diaryloxide, and the like, and mixtures thereof. Trihydrocarbylaluminum compounds are generally preferred.

Some specific examples of organoaluminum compounds that can be utilized include trimethylaluminum, triethylaluminum, triisobutylaluminum, tri-n-propylaluminum, triisopropylaluminum, tri-n-butylaluminum, tri-t-butylaluminum, tri-n-hexylaluminum, tri-n-octylaluminum, tricyclohexylaluminum, triphenylaluminum, tri-p-tolylaluminum, tribenzylaluminum, trineopentylaluminum, tris(1-methylcyclopentyl)aluminum, tris(2,6-dimethylphenyl) aluminum, diethylphenylaluminum, diethyl-p-tolylaluminum, diethylbenzylaluminum, ethyldiphenylaluminum, ethyldi-p-tolylaluminum, ethyldibenzylaluminum, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride, ethylaluminum dihydride, n-propylaluminum dihydride, isopropylaluminum dihydride, n-butylaluminum dihydride, isobutylaluminum dihydride, -octylaluminum dihydride, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis (neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, tris(fluromethyl)aluminum, and the like, and mixtures thereof.

Another class of organoaluminum compounds that can be utilized to form ingredient (c) of the catalyst composition of this invention is aluminoxanes. Aluminoxanes are well known in the art and comprise oligomeric linear aluminoxanes that can be represented by the general formula:

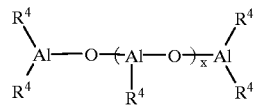

and oligomeric cyclic aluminoxanes that can be represented by the general formula:

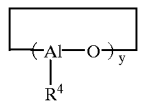

where x is an integer of 1 to about 100, preferably about 10 to about 50; y is an integer of 2 to about 100, preferably about 3 to about 20; and each $R^4$, which may be the same or different, is a mono-valent organic group that is attached to the aluminum atom via a carbon atom. Preferably, each $R^4$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atoms, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

In general, aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is added to the monomer or monomer solution that is to be polymerized, and then water is added.

Some specific examples of suitable aluminoxane compounds that can be utilized include methylaluminoxane (MAO), modified methylaluminoxane (MMAO), ethylaluminoxane, n-propylaluminoxane, isopropylaluminoxane, n-butylaluminoxane, n-hexylaluminoxane, n-octylaluminoxane, isobutylaluminoxane, t-butylaluminoxane, neopentylaluminoxane, cyclohexylaluminoxane, 1-methylcyclopentylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20–80% of the methyl groups of methylaluminoxane with $C_2$ to $C_{12}$ hydrocarbyl groups, preferably with isobutyl groups, by using techniques known to those skilled in the art.

The catalyst composition of this invention has very high catalytic activity over a wide range of total catalyst concentrations and catalyst ingredient ratios. The polymers having the most desirable properties, however, are obtained within a narrower range of total catalyst concentrations and catalyst ingredient ratios. Further, it is believed that the three catalyst ingredients (a), (b), and (c) can interact to form an active catalyst species. Accordingly, the optimum concentration for any one catalyst ingredient is dependent upon the concentrations of the other catalyst ingredients. The molar ratio of the hydrogen phosphite to the iron-containing compound (P/Fe) can be varied from about 0.5:1 to about 50:1, more preferably from about 1:1 to about 25:1, and even more preferably from about 2:1 to about 10:1. The molar ratio of the aluminum in the blend of two or more organoaluminum compounds to the iron-containing compound (Al/Fe) can be varied from about 1:1 to about 100:1, more preferably from about 3:1 to about 50:1, and even more preferably from about 5:1 to about 25:1.

As discussed above, the catalyst composition of the present invention is preferably formed by combining the three catalyst ingredients (a), (b), and (c). Although an active catalyst species is believed to result from this combination, the degree of interaction or reaction between the various ingredients or components is not known with any great degree of certainty. Therefore, it should be understood that the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of the present invention can be formed by combining or mixing the catalyst ingredients or components by using, for example, one of the following methods.

First, the catalyst composition may be formed in situ by adding the three catalyst ingredients to a solution containing monomer and solvent, or simply bulk monomer, in either a stepwise or simultaneous manner. When adding the catalyst ingredients in a stepwise manner, the sequence in which the ingredients are added is not critical. Preferably, however, the iron-containing compound is added first, followed by the hydrogen phosphite, and finally followed by the blend of two or more organoaluminum compounds.

Second, the three catalyst ingredients may be pre-mixed outside the polymerization system at an appropriate temperature, which is generally from about –20° C. to about 80° C., and the resulting catalyst composition is then added to the monomer solution.

Third, the catalyst composition may be preformed in the presence of monomer. That is, the three catalyst ingredients are pre-mixed in the presence of a small amount of monomer at an appropriate temperature, which is generally from about –20° C. to about 80° C. The amount of monomer that is used for the catalyst pre-forming can range from about 1 to about 500 moles per mole of the iron-containing compound, and preferably should be from about 4 to about 100 moles per mole of the iron-containing compound. The resulting catalyst composition is then added to the remainder of the monomer that is to be polymerized.

Fourth, the catalyst composition may be formed by using a two-stage procedure. The first stage involves combining the iron-containing compound and the blend of two or more organoaluminum compounds in the presence of a small amount of monomer at an appropriate temperature, which is generally from about –20° C. to about 80° C. In the second stage, the foregoing reaction mixture and the hydrogen phosphite are charged in either a stepwise or simultaneous manner to the remainder of the monomer that is to be polymerized.

Fifth, an alternative two-stage procedure may also be employed. An iron-ligand complex is first formed by pre-combining the iron-containing compound with the hydrogen phosphite. Once formed, this iron-ligand complex is then combined with the blend of two or more organoaluminum compounds to form the active catalyst species. The iron-ligand complex can be formed separately or in the presence of the monomer that is to be polymerized. This complexation reaction can be conducted at any convenient temperature at normal pressure, but for an increased rate of reaction, it is preferable to perform this reaction at room temperature or above. The temperature and time used for the formation of the iron-ligand complex will depend upon several variables including the particular starting materials and the solvent employed. Once formed, the iron-ligand complex can be used without isolation from the complexation reaction mixture. If desired, however, the iron-ligand complex may be isolated from the complexation reaction mixture before use.

With respect to the catalyst ingredient (c), i.e., the blend of two or more organoaluminum compounds, it is advantageous to preform this blend by combining two or more organoaluminum compounds prior to mixing the blend with the other catalyst ingredients and the monomers that are to be polymerized. Nevertheless, the blend of two or more organoaluminum compounds can also be formed in situ. That is, the two or more organoaluminum compounds are combined at the time of polymerization in the presence of the other catalyst ingredients and the monomers that are to be polymerized.

When a solution of the iron-based catalyst composition or one or more of the catalyst ingredients is prepared outside the polymerization system as set forth in the foregoing methods, an organic solvent or carrier is preferably employed. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. Non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred. The foregoing organic solvents may serve to dissolve the catalyst composition or ingredients, or the solvent may simply serve as a carrier in which the catalyst composition or ingredients may be suspended.

As described above, the catalyst composition utilized in the present invention exhibits a very high catalytic activity for the polymerization of conjugated dienes. Some specific examples of conjugated diene that can be polymerized include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in co-polymerization. The preferred conjugated dienes are 1,3-butadiene, isoprene, 1,3-pentadiene, and 1,3-hexadiene. The most preferred monomer is 1,3-butadiene inasmuch as the catalyst composition of this invention advantageously has very high catalytic activity and stereoselectivity for polymerizing 1,3-butadiene into syndiotactic 1,2-polybutadiene, and, as noted above, the melting temperature of the syndiotactic 1,2-polybutadiene can be adjusted.

The production of conjugated diene polymers, such as syndiotactic 1,2-polybutadiene, according to this invention is accomplished by polymerizing conjugated diene monomers in the presence of a catalytically effective amount of the foregoing catalyst composition. There are available a variety of methods for bringing the ingredients of the catalyst composition into contact with conjugated dienes as described above. To understand what is meant by a catalytically effective amount, it should be understood that the total catalyst concentration to be employed in the polymerization mass depends on the interplay of various factors such as the purity of the ingredients, the polymerization temperature, the polymerization rate and conversion desired, and many other factors. Accordingly, specific total catalyst concentration cannot be definitively set forth except to say that catalytically effective amounts of the respective catalyst ingredients should be used. Generally, the amount of the iron-containing compound used can be varied from about 0.01 to about 2 mmol per 100 g of conjugated diene monomers, with a more preferred range being from about 0.02 to about 1.0 mmol per 100 g of conjugated diene monomers, and a most preferred range being from about 0.05 to about 0.5 mmol per 100 g of conjugated diene monomers.

The polymerization of conjugated diene monomers according to this invention is preferably carried out in an organic solvent as the diluent. Accordingly, a solution polymerization system may be employed in which both the monomer to be polymerized and the polymer formed are soluble in the polymerization medium. Alternatively, a precipitation polymerization system may be employed by choosing a solvent in which the polymer formed is insoluble. In both cases, an amount of the organic solvent in addition to the organic solvent that may be used in preparing the iron-based catalyst composition is usually added to the polymerization system. The additional organic solvent may be either the same as or different from the organic solvent contained in the catalyst solutions. It is normally desirable to select an organic solvent that is inert with respect to the catalyst composition employed to catalyze the polymerization. Suitable types of organic solvents that can be utilized as the diluent include, but are not limited to, aliphatic, cycloaliphatic, and aromatic hydrocarbons. Some representative examples of suitable aliphatic solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. Some representative examples of suitable aromatic solvents include benzene, toluene, xylenes, ethylbenzene, diethylbenzene, mesitylene, and the like. Commercial mixtures of the above hydrocarbons may also be used. For environmental reasons, aliphatic and cycloaliphatic solvents are highly preferred.

The concentration of conjugated diene monomers to be polymerized is not limited to a special range. Generally, however, it is preferred that the concentration of the monomer present in the polymerization medium at the beginning of the polymerization be in a range of from about 3% to about 80% by weight, more preferably from about 5% to about 50% by weight, and even more preferably from about 10% to about 30% by weight.

The polymerization of conjugated diene monomers according to this invention may also be carried out by means of bulk polymerization, which refers to a polymerization environment where no solvents are employed. Bulk polymerization can be conducted either in a condensed liquid phase or in a gas phase.

In performing the polymerization of conjugated diene monomers according to this invention, a molecular weight regulator may be employed to control the molecular weight of the conjugated diene polymers to be produced. As a result, the scope of the polymerization system can be expanded in such a manner that it can be used for the production of conjugated diene polymers having a wide range of molecular weights. Suitable types of molecular weight regulators that can be utilized include, but are not limited to, α-olefins such as ethylene, propylene, 1-butene, 1-pentene, 1-hexene, 1-heptene, and 1-octene; accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene and vinylacetylene; and mixtures thereof. The amount of the molecular weight regulator used, expressed in parts per hundred parts by weight of the conjugated diene monomers (phm), is from about 0.01 to about 10 phm, preferably from about 0.02 to about 2 phm, and more preferably from about 0.05 to about 1 phm.

The molecular weight of the conjugated diene polymers to be produced can also be effectively controlled by polymerizing conjugated diene monomers in the presence of hydrogen gas. In this case, the preferable partial pressure of hydrogen gas is within the range of about 0.01 to about 50 atmospheres.

The polymerization of conjugated diene monomers according to this invention may be carried out as a batch process, a continuous process, or even a semi-continuous process. In the semi-continuous process, monomer is intermittently charged as needed to replace that monomer already polymerized. In any case, the polymerization is desirably conducted under anaerobic conditions by using an inert protective gas such as nitrogen, argon or helium, with moderate to vigorous agitation. The polymerization temperature employed in the practice of this invention may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by the addition of a polymerization terminator that inactivates the catalyst. Typically, the terminator employed is a protic compound, which includes, but is not limited to, an alcohol, a carboxylic acid, an inorganic acid, water, or a mixture thereof. An antioxidant such as 2,6-di-tert-butyl-4-methylphenol may be added along with, before or after the addition of the terminator. The amount of the antioxidant employed is preferably in the range of 0.2% to 1% by weight of the polymer product. When the polymerization reaction has been stopped, the polymer can be recovered from the polymerization mixture by conventional procedures of desolventization and drying. For instance, the polymer may be isolated from the polymerization mixture by coagulation of the polymerization mixture with an alcohol such as methanol, ethanol, or isopropanol, or by steam distillation of the solvent and the unreacted monomer, followed by filtration. The polymer product is then dried to remove residual amounts of solvent and water.

As noted above, a preferred embodiment of this invention is directed toward a process for the synthesis of crystalline conjugated diene polymers such as syndiotactic 1,2-polybutadiene. Advantageously, the melting temperature of the resulting crystalline conjugated diene polymers produced according to this invention can be manipulated by employing a blend of two or more organoaluminum compounds that have distinct steric hindrance. In general, it has been found that the use of a sterically hindered organoaluminum compound within the iron-based catalyst composition gives rise to a polymer having a relatively high melting temperature, and that the use of a sterically non-hindered organoaluminum compound within the iron-based catalyst composition gives rise to a polymer having a relatively low melting temperature. Surprisingly, it has been discovered that by employing a blend of sterically dissimilar organoaluminum compounds, one can tailor the melting temperature of the resulting polymer. In other words, by using a blend of a sterically hindered organoaluminum compound that yields a polymer having a relatively high melting temperature and a sterically non-hindered organoaluminum compound that yields a polymer having a relatively low melting temperature, one can obtain a polymer whose melting temperature is somewhere between the relatively high and relative low temperatures.

For example, when an acyclic hydrogen phosphite is employed within the iron-based catalyst composition, the use of a sterically non-hindered organoaluminum compound generally yields a syndiotactic 1,2-polybutadiene polymer having a melting temperature of from about 90° C. to about 130° C. On the other hand, the use of a sterically hindered organoaluminum compound generally yields a syndiotactic 1,2-polybutadiene polymer having a melting temperature of from about 180° C. to about 210° C. By using a blend of a sterically hindered organoaluminum compound and a sterically non-hindered organoaluminum compound, one can obtain a syndiotactic 1,2-polybutadiene polymer whose melting temperature is somewhere between about 90° C. and about 210° C. when an acyclic hydrogen phosphite is used within the catalyst composition. Advantageously, the process of this invention allows for the synthesis of syndiotactic 1,2-polybutadiene having a melting temperature from about 130° C. to about 170° C., more advantageously from about 140° C. to about 170° C., and even more advantageously from about 150° C. to about 160° C.

Moreover, the desired melting temperature of the resulting crystalline conjugated diene polymer can be achieved by adjusting the molar ratio of the hindered to non-hindered organoaluminum compounds. In general, the melting temperature of the resulting polymer can be increased by increasing the molar ratio of the hindered to non-hindered organoaluminum compounds. Likewise, the melting temperature of the resulting polymer can be decreased by decreasing the molar ratio of the hindered to non-hindered organoaluminum compounds.

In addition to adjusting the molar ratio of the hindered to non-hindered organoaluminum compounds, the melting temperatures of the resulting crystalline conjugated diene polymer can be manipulated by selecting certain organoaluminum compounds within the class of hindered compounds, by selecting certain organoaluminum compounds within the class of non-hindered compounds, or by selecting one or more from each class. The selected organoaluminum compounds are then combined to form ingredient (c) of the catalyst composition.

It has also been found that the molecular weight, 1,2-linkage content, and syndiotacticity of the syndiotactic 1,2-polybutadiene can be increased by increasing the molar ratio of the hindered to non-hindered organoaluminum compounds within the blend of two or more sterically distinct organoaluminum compounds.

The syndiotactic 1,2-polybutadiene produced with the catalyst composition of this invention has many uses. It can be blended with various rubbers in order to improve the properties thereof. For example, it can be incorporated into elastomers in order to improve the green strength of those elastomers, particularly in tires. The supporting or reinforcing carcass of tires is particularly prone to distortion during tire building and curing procedures. For this reason, the incorporation of the syndiotactic 1,2-polybutadiene into rubber compositions that are utilized in the supporting carcass of tires has particular utility in preventing or minimizing this distortion. In addition, the incorporation of the syndiotactic 1,2-polybutadiene into tire tread compositions can reduce the heat build-up and improve the tear and wear characteristics of tires. The syndiotactic 1,2-polybutadiene is also useful in the manufacture of films and packaging materials and in many molding applications.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

General Experimentation

EXAMPLE 1

An oven-dried 1-liter glass bottle was capped with a self-sealing rubber liner and a perforated metal cap. After the bottle was thoroughly purged with a stream of dry nitrogen gas, the bottle was charged with 73 g of hexanes and 177 g of a 1,3-butadiene/hexanes blend containing 28.3% by weight of 1,3-butadiene. The following catalyst ingredients were added to the bottle in the following order: (1) 0.050 mmol of iron(III) 2-ethylhexanoate, (2) 0.20 mmol of bis(2-ethylhexyl) hydrogen phosphite, and (3) 0.75 mmol of triethylaluminum. The bottle was tumbled for 4 hours in a water bath maintained at 50° C. The polymerization was terminated by addition of 10 mL of isopropanol containing 1.0 g of 2,6-di-tert-butyl-4-methylphenol. The polymerization mixture was coagulated with 3 liters of isopropanol. The resulting syndiotactic 1,2-polybutadiene was isolated by filtration and dried to a constant weight under vacuum at 60° C. The yield of the polymer was 45.3 g (91%). As measured by differential scanning calorimetry (DSC), the polymer had a melting temperature of 133° C. The $^1H$ and $^{13}C$ nuclear magnetic resonance (NMR) analysis of the polymer indicated a 1,2-linkage content of 88.3% and a syndiotacticity of 76.1%. As determined by gel permeation chromatography (GPC), the polymer had a weight average molecular weight ($M_w$) of 512,000, a number average molecular weight ($M_n$) of 226,000, and a polydispersity index ($M_w/M_n$) of 2.3. The monomer charge, the amounts of the catalyst ingredients, the polymer yield, and the properties of the resulting syndiotactic 1,2-polybutadiene are summarized in Table I.

TABLE I

| Example No. | 1 | 2 | 3 | 4 | 5 |
| --- | --- | --- | --- | --- | --- |
| Hexanes (g) | 73 | 73 | 73 | 73 | 73 |
| 28.3% 1,3-Bd/hexanes (g) | 177 | 177 | 177 | 177 | 177 |
| Fe(2-EHA)$_3$ (mmol) | 0.050 | 0.050 | 0.050 | 0.050 | 0.050 |
| HP(O)(OCH$_2$CH(Et)(CH$_2$)$_3$CH$_3$)$_2$ (mmol) | 0.20 | 0.20 | 0.20 | 0.20 | 0.20 |
| i-Bu$_3$Al/Et$_3$Al molar ratio | 0:100 | 30:70 | 50:50 | 70:30 | 100:0 |
| Total AlR$_3$ (mmol) | 0.75 | 0.75 | 0.75 | 0.75 | 0.75 |
| Fe/P/Al molar ratio | 1:4:15 | 1:4:15 | 1:4:15 | 1:4:15 | 1:4:15 |
| Polymer yield (%) after 4 hr at 50° C. | 91 | 98 | 97 | 98 | 96 |
| Melting temperature (° C.) | 133 | 144 | 157 | 179 | 188 |
| $M_w$ | 512,000 | 580,000 | 629,000 | 719,000 | 773,000 |
| $M_n$ | 226,000 | 264,000 | 299,000 | 359,000 | 381,000 |
| $M_w/M_n$ | 2.3 | 2.2 | 2.1 | 2.0 | 2.0 |
| 1,2-Linkage content (%) | 87.3 | 88.0 | 89.2 | 89.8 | 90.9 |
| Syndiotacticity (%) | 76.9 | 81.0 | 87.5 | 90.1 | 93.3 |

EXAMPLES 2–5

In Examples 2–5, the procedure described in Example 1 was repeated except that triisobutylaluminum/triethylaluminum mixtures having various molar ratios, i.e., 30:70, 50:50, 70:30, and 100:0 were substituted for the triethylaluminum. Table I summarizes the monomer charge, amounts of the catalyst ingredients, polymer yields, and the properties of the resulting syndiotactic 1,2-polybutadiene produced in each example.

As shown in Table I, the melting temperature, molecular weight, 1,2-linkage content, and syndiotacticity of the syndiotactic 1,2-polybutadiene can be increased by increasing the molar ratio of triisobutylaluminum to triethylaluminum.

EXAMPLES 6–10

In Examples 6–10, the procedure described in Example 1 was repeated except that triisobutylaluminum/tri-n-butylaluminum mixtures having various molar ratios, i.e., 0:100, 30:70, 50:50, 70:30, and 100:0 were substituted for the triethylaluminum. The monomer charge, the amounts of the catalyst ingredients, the polymer yields, and the properties of the resulting syndiotactic 1,2-polybutadiene are summarized in Table II.

TABLE II

| Example No. | 6 | 7 | 8 | 9 | 10 |
|---|---|---|---|---|---|
| Hexanes (g) | 73 | 73 | 73 | 73 | 73 |
| 28.3% 1,3-Bd/hexanes (g) | 177 | 177 | 177 | 177 | 177 |
| Fe(2-EHA)$_3$ (mmol) | 0.050 | 0.050 | 0.050 | 0.050 | 0.050 |
| HP(O)(OCH$_2$CH(Et)(CH$_2$)$_3$CH$_3$)$_2$ (mmol) | 0.20 | 0.20 | 0.20 | 0.20 | 0.20 |
| i-Bu$_3$Al/n-Bu$_3$Al molar ratio | 0:100 | 30:70 | 50:50 | 70:30 | 100:0 |
| Total AlR$_3$ (mmol) | 0.75 | 0.75 | 0.75 | 0.75 | 0.75 |
| Fe/P/Al molar ratio | 1:4:15 | 1:4:15 | 1:4:15 | 1:4:15 | 1:4:15 |
| Polymer yield (%) after 4 hr at 50° C. | 96 | 98 | 99 | 98 | 96 |
| Melting temperature (° C.) | 133 | 146 | 158 | 171 | 188 |
| M$_w$ | 424,000 | 561,000 | 625,000 | 700,000 | 773,000 |
| M$_n$ | 191,000 | 278,000 | 298,000 | 320,000 | 381,000 |
| M$_w$/M$_n$ | 2.2 | 2.0 | 2.1 | 2.2 | 2.0 |
| 1,2-Linkage content (%) | 87.0 | 88.2 | 89.6 | 90.2 | 90.9 |
| Syndiotacticity (%) | 77.7 | 81.4 | 87.0 | 89.6 | 93.3 |

As shown in Table II, the melting temperature, molecular weight, 1,2-linkage content, and syndiotacticity of the syndiotactic 1,2-polybutadiene can be increased by increasing the molar ratio of triisobutylaluminum to tri-n-butylaluminum.

Various modifications and alterations that do not depart from the scope and spirit of this invention will become apparent to those skilled in the art. This invention is not to be duly limited to the illustrative embodiments set forth herein.

What is claimed is:

1. A process for preparing conjugated diene polymers comprising the step of:
   polymerizing conjugated diene monomers in the presence of a catalytically effective amount of a catalyst composition formed by combining:
   (a) an iron-containing compound;
   (b) a hydrogen phosphite; and
   (c) a blend of two or more sterically distinct organoaluminum compounds.

2. The process of claim 1, where the conjugated diene monomers are 1,3-butadiene, 1,3-pentadiene, 1,3-hexadiene, or mixtures thereof, thereby forming a crystalline conjugated diene polymer.

3. The process of claim 2, where the conjugated diene monomers are 1,3-butadiene, thereby forming syndiotactic 1,2-polybutadiene.

4. The process of claim 3, where the hydrogen phosphite is an acyclic hydrogen phosphite.

5. The process of claim 4, where the acyclic hydrogen phosphite is defined by the following keto-enol tautomeric structure:

where R$^1$ and R$^2$, which may be the same or different, are mono-valent organic groups.

6. The process of claim 1, where the blend of two or more sterically distinct organoaluminum compounds includes at least one sterically hindered organoaluminum compound and at least one sterically non-hindered organoaluminum compound.

7. The process of claim 4, where the blend of two or more sterically distinct organoaluminum compounds includes at least one sterically hindered organoaluminum compound and at least one sterically non-hindered organoaluminum compound.

8. The process of claim 7, where the at least one sterically hindered organoaluminum compound is triisopropylaluminum, triisobutylaluminum, tri-t-butylaluminum, trineopentylaluminum, tricyclohexylaluminum, tris(1-methylcyclopentyl)aluminum, tris(2,6-dimethylphenyl)aluminum, or mixtures thereof.

9. The process of claim 7, where the at least one sterically non-hindered organoaluminum compound is trimethylaluminum, triethylaluminum, tri-n-propylaluminum, tri-n-butylaluminum, tri-n-hexylaluminum, tri-n-octylaluminum, or mixtures thereof.

10. The process of claim 7, where the at least one sterically hindered organoaluminum compound is isopropylaluminoxane, isobutylaluminoxane, t-butylaluminoxane, neopentylaluminoxane, cyclohexylaluminoxane, 1-methylcyclopentylaluminoxane, 2,6-dimethylphenylaluminoxane, or mixtures thereof.

11. The process of claim 7, where the at least one sterically non-hindered organoaluminum compound is methylaluminoxane, ethylaluminoxane, n-propylaluminoxane, n-butylaluminoxane, n-hexylaluminoxane, n-octylaluminoxane, or mixtures thereof.

12. A method for controlling the melting temperature of a crystalline conjugated diene polymer that is prepared by polymerizing conjugated diene monomers with a catalyst composition that is formed by combining (a) an iron-containing compound, (b) a hydrogen phosphite, and (c) a blend of two or more sterically distinct organoaluminum compounds, the method comprising the steps of:
   selecting at least one sterically hindered organoaluminum compound;
   selecting at least one sterically non-hindered organoaluminum compound;
   combining the selected organoaluminum compounds to form ingredient (c) of the catalyst composition; and
   thereafter polymerizing the conjugated diene monomers with the catalyst composition.

13. The method of claim 12, where the conjugated diene monomers are 1,3-butadiene, 1,3-pentadiene, 1,3-hexadiene, or mixtures thereof, thereby forming a crystalline conjugated diene polymer.

14. The method of claim 13, where the conjugated diene monomers are 1,3-butadiene, thereby forming syndiotactic 1,2-polybutadiene.

15. The method of claim 14, further comprising the step of increasing the molar ratio of the sterically hindered organoaluminum compounds to the sterically non-hindered organoaluminum compounds in order to increase the melting temperature of the syndiotactic 1,2-polybutadiene.

16. The method of claim 14, further comprising the step of decreasing the molar ratio of the sterically hindered organoaluminum compounds to the sterically non-hindered organoaluminum compounds in order to decrease the melting temperature of the resulting polymer.

17. The method of claim 14, where the hydrogen phosphite is an acyclic hydrogen phosphite.

18. The method of claim 12, where the at least one sterically hindered organoaluminum compound is triisopropylaluminum, triisobutylaluminum, tri-t-butylaluminum, trineopentylaluminum, tricyclohexylaluminum, tris(1-methylcyclopentyl)aluminum, tris(2,6-dimethylphenyl)aluminum, or a mixture thereof.

19. The method of claim 12, where the at least one sterically non-hindered organoaluminum compound is trimethylaluminum, triethylaluminum, tri-n-propylaluminum, tri-n-butylaluminum, tri-n-hexylaluminum, tri-n-octylaluminum, or a mixture thereof.

* * * * *